United States Patent [19]

Kuipers

[11] Patent Number: 4,977,720
[45] Date of Patent: Dec. 18, 1990

[54] SURFACE WELDED THERMOPLASTIC ROOFING SYSTEM

[76] Inventor: Charles A. Kuipers, 1331 Crestview Dr., Denver, Pa. 17517

[21] Appl. No.: 371,312

[22] Filed: Jun. 26, 1989

[51] Int. Cl.⁵ ............................................. E04B 5/00
[52] U.S. Cl. ...................................... 52/408; 52/410; 52/506
[58] Field of Search .................. 52/506, 408, 409, 410

[56] References Cited

U.S. PATENT DOCUMENTS

| | | | |
|---|---|---|---|
| 4,726,164 | 2/1988 | Reinwall et al. | 52/410 |
| 4,727,699 | 3/1988 | Sargent | 52/410 |
| 4,736,552 | 4/1988 | Ward et al. | 52/410 X |
| 4,744,187 | 5/1988 | Tripp | 52/410 |
| 4,841,706 | 6/1989 | Resan | 52/410 |
| 4,843,774 | 7/1989 | Korsgaard | 52/408 |

*Primary Examiner*—David A. Scherbel
*Assistant Examiner*—Linda Jean Hoffert

[57] ABSTRACT

A surface welded plastic roofing system overlying a roof-supporting deck which bears a layer of thermal insulation, the system including a plurality of thermoplastic fastener plates mounted on top of the thermal insulation and affixed to the deck by means of a suitable fastener that penetrates the thermal insulation, the system including a thermoplastic top membrane overlying all the fastener plates and covering the entire roof, the bottom portion of the top membrane overlying each fastener plate being fused to the fastener plate by means of a welding material.

2 Claims, 1 Drawing Sheet

SURFACE WELDED THERMOPLASTIC ROOFING SYSTEM

BACKGROUND OF THE INVENTION

The invention relates to a roofing system having a top membrane exposed to the atmosphere composed of a suitable thermoplastic material. The present roofing system has no tie-down features that penetrate the top membrane and which might leak when exposed to the elements over the years. Instead, the present system is a fused, homogeneous, thermoplastic system strongly bonded to the roof itself by means of a fused thermoplastic system.

Prior systems such as those described in U. S. Pat. No. 4,455,804-Francovitch used hold-down plates adapted to carry a mastic, but which described penetration of the roofing membrane itself.

It is the objection of this invention to present a uniform, homogeneous, welded, unbroken weather-resistant top thermoplastic roofing membrane.

SUMMARY OF THE INVENTION

The invention contemplates a roof-supporting deck having a layer of thermal insulation overlaying the top of the deck itself. A plurality of thermoplastic fastener plates are mounted on top of thermal insulation by means of a suitable fastener that penetrates the thermal insulation and, preferably, enters the deck itself. A thermoplastic top membrane covers the entire roof and overlies the fastener plates. This top thermoplastic membrane may be laid down in strips measuring two feet wide to ten feet wide, each strip overlapping another by about an inch to several inches, overlaps being fused to form a homogeneous fused top roof surface. A fused thermoplastic welding material overlies the top of each thermoplastic fastener. The fused welding material is fused to the top of the thermoplastic fastener and to the bottom of the top membrane portions which overlie each fastener. Thus, the top roofing membrane is securely fastened to the roof itself, resistant to wind and all weather conditions including heavy rain and snow, while presenting a uniform, unbroken, unpenetrated surface to the elements.

DETAILED DESCRIPTION OF PREFERRED EMBODIMENTS

Figure 1:
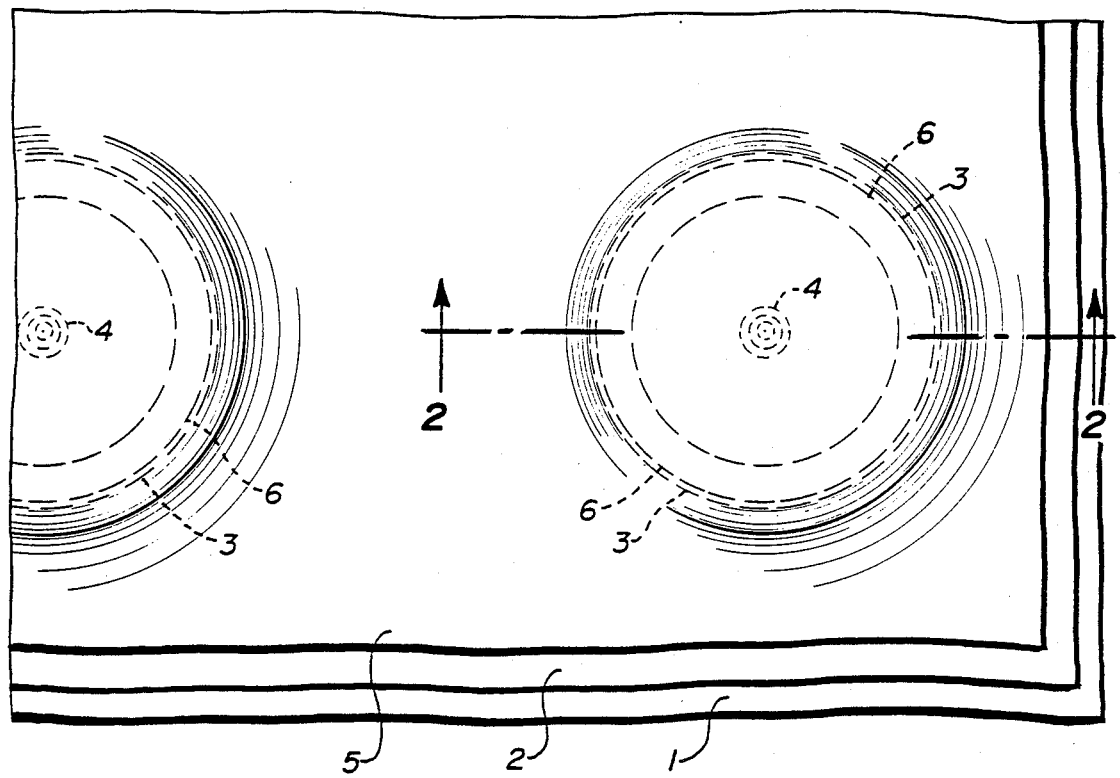
FIG. 1 a top plan view.
Figure 2:
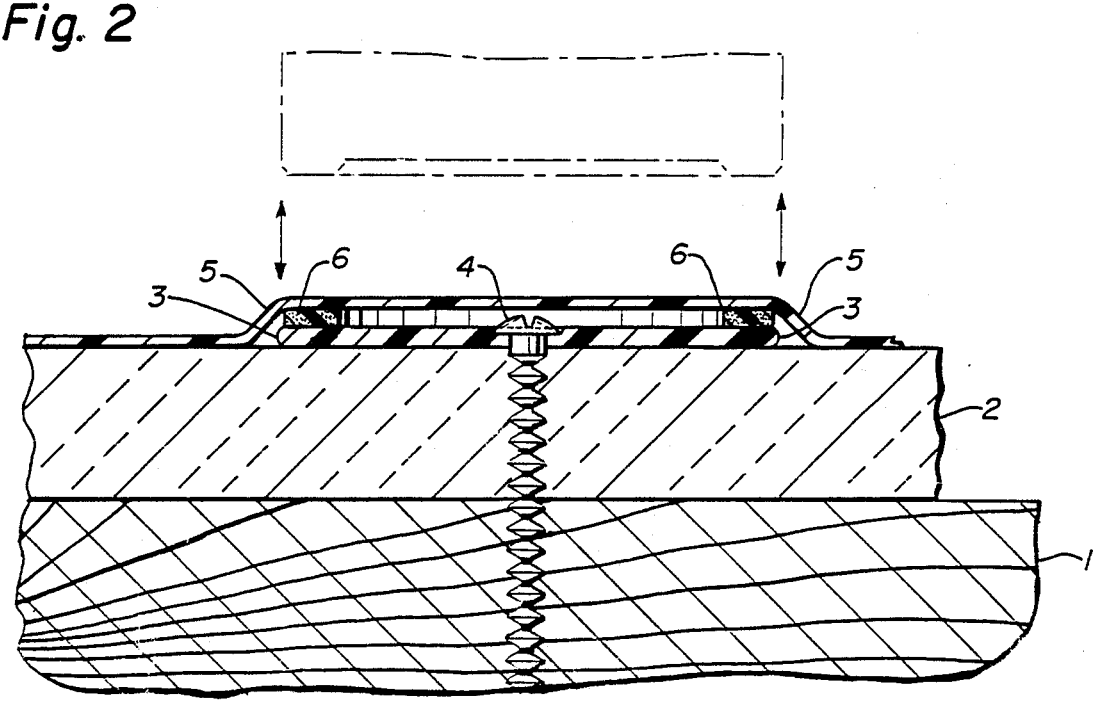
FIG. 2 is a cross sectional view of FIG. 1 taken on the line 2—2.

Referring to the drawings, a roof deck 1 is overlain with insulation 2. The thermoplastic fastener plate 3 is positioned on the upper surface of the insulation 2 and held firmly in place with a fastener 4 which penetrates the insulation 2 and is seated in the deck 1. The thermoplastic fastener plate 3 may have a diameter in the range of 1 to 6 inches, although the size of the fastener plate is not critical. The fastener plates may be of any sturdy plastic material such as plasticized or unplasticized polyethylene, polypropylene, unplasticized polyvinylchloride, and the like. These thermoplastic fastener plates may be positioned on the roof surface on 4 foot centers, although the exact spacing is not critical as long as they are sufficiently close together to hold down the top membrane 5. The top membrane must be a thermoplastic, and may be made of polyvinylchloride, chlorinated polyethylene, chlorosulfonated polyethylene, and the thermoplastic olefins, plasticized or unplasticized. Preferably the top membrane 5 and the fastener plates 3 are an unplasticized thermoplastic in order to prevent the bleeding of plasticizer over the years. While the thickness of the thermoplastic fastener plates 3 is not critical, it is preferred that the thickness be in the range of about $\frac{1}{8}$ to $\frac{1}{4}$ inch.

The top membrane 5, the actual exposed surface of the roofing system, is a known item of commerce and may be fabricated from any of the materials listed above for the fastener plates. The top membrane 5 will generally have a thickness in the range of about 0.039 to 0.060 mil, and, since it bears the weight of foot traffic across the roof, it will often contain enough plasticizer to impart resiliency. Rolls of the top membrane 5 are obtainable in widths generally running from 2 feet to 10 feet, with 6 feet wide being a sort of standard. The wider the rolls of the top membrane 5, the faster the installation of the roof system, since the top membrane will simply be unrolled over the top of the previously installed fastener plates 3. Prior to covering the fastener plates 3 with the top membrane 5, a suitable welding material 6 is placed on the upper surface of a preselected number of the fastener plate 3. Some fastener plates may be used solely to hold the thermal insulation to the deck. The welding material 6 will, again, be a thermoplastic which, when fused, will blend in with fused surfaces of the top membrane 5 and the plate fastener 3. The welding material 6 is conveniently laid on the top surface of the fastener plates 3 in the form of a ring just inside the periphery of the fastener plates. The welding material 6 can also be placed on top of the fastener plates 3 in the form of a small circular or square sheet. A blob of the welding material 6 may in any case be placed over the head of the penetrating fastener 4. In a preferred embodiment, the welding material 6 contains iron filings responsive to inductive heating. In such an embodiment, an induction electromagnetic welder is simply placed on top of the top membrane 5 at each plate fastener location and activated in order to heat and fuse the welding material 6 sufficiently to join the top membrane 5 and the fastener plate 3 by fusion to yield a tough, strong bond.

The welding material 6 is commercially available as a magnetically active weld material containing micron-sized ferromagnetic particles. The electromagnetic machine itself utilizes work-coils as the inductors which are water-cooled copper coils and which may be made from round, square, or rectangular cooper tubing. The work-coils may also be machined from cooper plates. The electromagnetic welding device for use of the preferred embodiment of the present invention will generally have a work-coil size and shape to match the size and shape of the fastener plates 3.

The process of the present invention is readily carried out. The fastener plates 3 are fastened to the roof by means of the fasteners 4 which may be a screw, a bolt, or even a nail, so long as the fastener 4 is adapted to hold the fastener plate 3 firmly into the roof. The welding material 6 is then placed on each fastener plate 3 and the rolls of the top membrane 5 are unrolled to cover the entire roof, having an overlap of $\frac{1}{2}$ inch to 3 inches, although the overlap is not critical so long as the adjacent plies of top membrane 5 are securely fastened. Such fastening is carried out by means of fusion with a hot iron or hot air. Adhesive bonding of adjacent edges of the top membrane 5 may also be used. Adhesives are available which are compatible with the top membrane sheets of various compositions.

The electromagnetic welding device is placed on top of each fastener plate and the inductor is activated to heat the welding material and cause fusion and adhesion to the bottom of the top membrane and the top of the plate fastener. Normally, the plate fasteners can be seen through the top membrane, but in the event the configuration of the plate fastener is such that it is difficult to see, a simple boss can be placed on the top of the plate fastener to show through to the top surface of the top membrane. With the overlapping edges of the top membrane fused or adhered together, and the welding material bonding, the bottom of the top of the fastener plate, the finished roof will be monolithic in the sense that nothing penetrates the unbroken surface of the top membrane. While the preferred process utilizes an electromagnetic welding unit to cause the adhesion of the top membrane to the fastener plate by means of a ferromagnetic containing welding material, a simple plastic composition may be used as the welding material, and the fusion carried out by the means of a hot iron, hot air, or any other suitable heating means.

What I claim is:

1. A surface welded thermoplastic roofing system comprising in combination:
   (a) A roof supporting deck having a layer of thermal insulation mounted on the top thereof;
   (b) A plurality of thermoplastic fastener plates mounted on the top of the thermal insulation and affixed to the deck by means of a fastener that penetrates the thermal insulation;
   (c) A thermoplastic top membrane overlying the fastener plates and covering the roof; and
   (d) A fused thermoplastic welding material on a preselected number of fastener plates and fused to the top surface of the fastener plate and to the bottom surface of that portion of the top membrane overlying the fastener plate, said thermoplastic welding material comprising a thermoplastic material containing ferromagnetic material susceptible to induction heating.

2. A surface welded thermoplastic roofing system comprising in combination:
   (a) A roof supporting deck having a layer of thermal insulation mounted on the top thereof;
   (b) A plurality of thermoplastic polypropylene fastener plates mounted on the top of the thermal insulation and affixed to the deck by means of a fastener that penetrates the thermal insulation;
   (c) A thermoplastic polypropylene top membrane overlying the fastener plates and covering the roof; and
   (d) A fused thermoplastic welding material on a preselected number of fastener plates and fused to the top surface of the fastener plates and to the bottom surface of that portion of the top membrane overlying the fastener plate, said thermoplastic welding material comprising a thermoplastic material containing ferromagnetic material susceptible to induction heating.

* * * * *